Patented Mar. 27, 1934

1,952,114

UNITED STATES PATENT OFFICE 1,952,114

FRICTION MATERIAL

Claude T. Begg, Bridgeport, Conn., assignor to Raybestos-Manhattan, Inc., Bridgeport, Conn., a corporation of New Jersey No Drawing. Application October 19, 1931, Serial No. 569,857

6 Claims. (Cl. 154—52)

This invention relates to friction material wherein a single friction element is provided with two or more friction surfaces, each having different frictional qualities so that a single friction element may be capable of performing different functions as such or similar functions to a different degree, and by selection of the suitable surface a single element is adaptable to mechanisms requiring differing frictional characteristics.

It is well known that the various types of brakes now in use require brake linings having widely different frictional characteristics. For example, a certain type of high servo action (highly self-actuated) mechanically operated brake performs most satisfactorily with a friction material having a frictional co-efficient of about .3, and a well known type of hydraulic brake operates most satisfactorily with a friction material having a co-efficient of about .6. Also cast iron or cast steel brake drums now coming into use require a higher coefficient of friction than steel drums. For practical purposes these are the minimum and maximum coefficients of friction required at the present time in commercial brake lining.

There has been a decided demand for a universal brake lining for replacement in order to limit stocks and provide better service. At the present time there is no one brake lining which will give equally good service on the mechanical and hydraulic brakes. If the brake lining has a coefficient of friction of .6, it may be satisfactory for the hydraulic brake but may tend to grab and show violent action when used in conjunction with high servo action mechanically operated brakes. A compromise lining, for example, having a coefficient of friction of say .45, will be moderately unsatisfactory for both uses in that it will tend to be slightly too sensitive when used in conjunction with the mechanically operated brakes and will be moderately inefficient on the hydraulic brakes.

It is obvious that a marked reduction in stocks of manufacturers, jobbers and dealers may be effected by providing a brake lining having a coefficient of friction of, say .3 to .4 on one friction surface, and .5 to .6 on the other friction surface so that the user may apply the side having the coefficient of friction range best suited to his brake.

In one embodiment of my invention, the brake lining may take the form of a flexible band which may be reversed so as to use either side. For instance, for an internal brake either side may be used in the convex position.

One method of preparing a flexible type of friction element is to make the product of Patent No. 1,677,842 and thereafter treat one side by coating, partially dipping, spreading or spraying with a friction augmenting saturant, for instance, China wood oil, which may on drying, or otherwise hardening, develop a frictional coefficient of from approximately .5 to .6, the other side remaining substantially as originally made and having a frictional coefficient of from approximately .3 to .4. It will be seen that a friction element made by this process may be used on both external and internal brakes where the brake may require either a low or high frictional coefficient range and as much has very wide adaptability.

It is to be understood, of course, that the invention broadly is not confined to any particular method of making brake lining since the product embodying the principles of my invention may be manufactured in any desired manner.

My invention is equally applicable to either the woven type friction element or the felted or molded type element. For instance, in the manufacture of a non-woven, felted structure, during the stage of making up the sheet on the wet machine, I may introduce a friction modifying ingredient such as wood flour, coal, graphite, carbon black, lead dust, litharge or the like into the fibers on and adjacent to one surface of the sheet by the method described in U. S. Patent No. 1,672,988, and then saturate the sheet, or strips cut from the sheet, with a suitable binder and harden and finish the same whereby, due to the friction modifying agent contained in one side and not contained in the other side, the friction qualities will be changed.

In another method utilizing rolls for preparing composition asbestos-rubber-filler sheet packing, I may build up substantially half the thickness of the sheet with a rubber-asbestos-filler compound having predetermined frictional qualities and then change while continuing the process of building up to a compound having a different predetermined set of frictional qualities, thereby making a combined structure which has two different compounds on the opposite faces. The sheet may then be removed, cut into strips of approximately the desired finished shape and cured in curved forms to change the shape as desired. It may also be cured so as to remain flexible so that either side can be used.

Another method of carrying out my invention embodying a woven structure having different frictional characteristics on friction faces is to coat one surface of the untreated woven tape with a viscous binder in quantity and viscosity so regulated as to penetrate only approximately one half the thickness of the tape. The binder which may be, for example, a viscous initial condensation product of the phenolic resin type, may be hardened. The other surface of the tape may be saturated with another binder which may be China wood oil, for example, having little or no solvent effect on the first binder. The second binder substance may be hardened to a suitable degree and thereby an element may be produced which definitely contains a phenol resin binder on one side having a moderately low coefficient of friction, and a drying oil binder on the other side having a considerably higher coefficient of friction.

I may also combine two relatively thin woven brake linings possessing different frictional characteristics previously made by any suitable manner or process, the combination being made through the medium of rivets or staples, lacing, or any other suitable means; or by cementing or bonding the two linings together with a suitable cement which, for instance, may be a hard rubber compound, a phenolic resin or the like. The inner surfaces may be prepared for the combining operation by sanding the surfaces smooth so as to provide surfaces more easily wet by the adhesive and, if desirable, a cloth, perforated metal sheet or wire mesh screen may be interposed to carry the adhesive and to act as a strain-supporting member against which the rivets used in attaching the lining may rest.

I may also prepare asbestos cloth carrying a rubber compound which, when vulcanized, will produce a material having one coefficient range, and another cloth carrying another compound which will have a different coefficient of friction range, for example, by introducing graphite or lead dust into the first compound to produce the second compound. The cloth may be slitted into strips and folded together to produce a multiple ply combination to provide the cloth carrying one compound on one surface and the cloth having the other compound on the opposite surface.

It will be readily seen that, in carrying out my invention, it is only necessary to vary the frictional qualities of the two sides so that the ranges of usefulness of the two sides will be materially different. The separation in frictional coefficients may be as high as or higher than .3 or as low as .05 depending upon the specific application for which the material is designed.

By the use of the expression "frictional quality" as used in the specification and claims is meant a group of desirable characteristics in friction material comprising primarily uniformity of coefficient of friction from the beginning to the end of the life of the frictional material, and a degree of wear combined with the above frictional coefficient which meets commercial requirement. High coefficient of friction does not necessarily indicate frictional quality for instance, the most satisfactory frictional material now in use on modern servo action internal brakes has a lower coefficient of friction than was previously considered necessary. Frictional quality, therefore, depends entirely upon the ability of the frictional material to maintain throughout its life a substantially constant coefficient of friction under the various conditions of use and abuse.

To my knowledge no brake lining has ever been specifically designed to have two definitely different frictional properties and to be definitely fitted for two or more distinctly different uses.

I claim as my invention:

1. A flexible unitary friction element having a plurality of friction surfaces on its opposite faces, each surface having a different predetermined coefficient of friction whereby either of said faces may be used as a friction surface.

2. A flexible unitary friction element having a plurality of friction surfaces on its opposite faces, the coefficients of friction of each surface differeing at least by .05 whereby either of said faces may be used as a friction surface.

3. A flexible unitary friction element having a plurality of friction surfaces on its opposite faces, the coefficients of friction of each surface differing at least by 0.1 whereby either of said faces may be used as a friction surface.

4. A flexible brake lining, characterized in that the opposite surfaces thereof are adapted for use as friction surfaces, each frictional surface possessing different predetermined frictional qualities.

5. A flexible brake lining, capable of being reversed in its curvature, each surface having a different predetermined coefficient of friction an inner surface being adapted to constitute a friction surface.

6. A reversible flexible brake lining having a low friction side and a high friction side an inner surface being adapted to constitute a friction surface.

CLAUDE T. BEGG.